United States Patent
Chaumontet et al.

(10) Patent No.: US 10,487,867 B2
(45) Date of Patent: Nov. 26, 2019

(54) SECURED CARABINER

(71) Applicant: ZEDEL, Crolles (FR)

(72) Inventors: Michael Chaumontet, Crolles (FR); Marc Jourdan, Saint Martin d'Heres (FR)

(73) Assignee: ZEDEL, Crolles (FR)

( * ) Notice: Subject to any disclaimer, the term of this patent is extended or adjusted under 35 U.S.C. 154(b) by 0 days.

(21) Appl. No.: 16/019,108

(22) Filed: Jun. 26, 2018

(65) Prior Publication Data

US 2018/0372145 A1 Dec. 27, 2018

(30) Foreign Application Priority Data

Jun. 26, 2017 (FR) ...................... 17 55849

(51) Int. Cl.
F16B 45/02 (2006.01)

(52) U.S. Cl.
CPC .................... F16B 45/02 (2013.01)

(58) Field of Classification Search
CPC ....................................................... F16B 45/02
See application file for complete search history.

(56) References Cited

U.S. PATENT DOCUMENTS

| | | | |
|---|---|---|---|
| 1,622,971 A | 3/1927 | Porter | |
| 6,622,354 B1* | 9/2003 | Klingier | F16B 45/02 24/599.6 |
| 8,752,254 B2* | 6/2014 | Perner | F16B 45/02 24/599.5 |
| D785,316 S * | 5/2017 | Grossman | D3/208 |
| 9,707,419 B2* | 7/2017 | Perner | A62B 35/0037 |
| 2003/0097737 A1* | 5/2003 | Gartsbeyn | F16B 45/02 24/599.7 |
| 2008/0022497 A1* | 1/2008 | Thompson | F16B 45/02 24/598.1 |
| 2011/0113604 A1* | 5/2011 | Chu | F16B 45/02 24/601.5 |
| 2013/0213735 A1 | 8/2013 | Dehondt et al. | |
| 2013/0247339 A1* | 9/2013 | Wurzer | F16B 45/02 24/600.1 |
| 2017/0348555 A1 | 12/2017 | Dehondt | |

FOREIGN PATENT DOCUMENTS

| | | |
|---|---|---|
| CH | 699 865 A2 | 5/2010 |
| CH | 706 384 A2 | 10/2013 |
| DE | 10 2014 007 993 A1 | 8/2015 |
| FR | 2 319 047 A1 | 2/1977 |
| FR | 2 967 076 A1 | 5/2012 |
| FR | 3 030 284 A1 | 6/2016 |

OTHER PUBLICATIONS

Mar. 8, 2018 Search Report issued in French Patent Application No. 1755849.

* cited by examiner

*Primary Examiner* — Robert Sandy
*Assistant Examiner* — David M Upchurch
(74) *Attorney, Agent, or Firm* — Oliff PLC (57) ABSTRACT

The carabiner comprises: a body defining an insertion slot of a rope extended by a securing area of the rope, a first clamp fitted movable between a standby position of the rope in the insertion slot and an obstruction position when the rope is in the securing area, the obstruction position being configured to prevent insertion of another rope in the securing area, a second clamp configured to allow movement of the rope from the insertion slot to the securing area and to prevent movement of the rope from the securing area to the insertion slot.

11 Claims, 5 Drawing Sheets

SECURED CARABINER

FIELD OF THE INVENTION

The invention relates to a carabiner presenting improved operation and more particularly to a carabiner which can be fitted at the top of a climbing route.

STATE OF THE ART

In conventional manner, a climber ascends a climbing route installing several belaying points as he/she progresses up the climb. When the climber reaches the top of the climb, he/she passes the rope through a fixed belaying point. The person who is belaying the climber slides the rope through the carabiner until the climber reaches the ground.

In climbing schools and especially in climbing gyms, the top of the climb is materialised by a carabiner or other belaying device. It is particularly advantageous to use a carabiner as installation of the rope is simple to implement.

However, the use of a carabiner gives rise to several safety problems. The carabiner does in fact have a movable gate enabling the rope to be inserted inside the ring defined by the carabiner, but the general configuration of the ring does not prevent the rope strand from passing back through the carabiner which results in the rope coming adrift from the carabiner.

To prevent this inconvenience, the Edelrid Company markets a carabiner which is intended to equip the top of climbing routes. The carabiner comprises a movable groove which is configured to accommodate insertion of the rope inside the carabiner and to then prevent the rope from being inserted in the carabiner again if a strand of rope is already present in the carabiner. Such a product is also disclosed in the document DE102014007993A1.

It is apparent that the use of such a product is not satisfactory as the rope can always escape from the carabiner in case of incorrect handling.

Another substantially identical embodiment is disclosed in the document CH706384 which proposes a carabiner with a clamping part that performs securing of the rope in two successive steps. The rope presses on a gate which actuates closing of an access slot to the inside of the carabiner until a securing area is reached where the rope is jammed and can no longer return to the access slot. To obtain this blocking, the blocking system is formed by means of a part of specific shape which collaborates with a ramp of the access slot. There again, it is apparent that this embodiment is not as efficient as expected, as the shape of the blocking system is linked to the shape of the ramp and to the diameter of the rope, which makes the carabiner particularly difficult to produce in industrial manner.

Provision of a carabiner limiting insertion of a second rope strand is also known from the document CH699865 which proposes to use a ratchet wheel arranged to rotate in one direction only. Such a method of proceeding proves particularly difficult to implement and not very efficient. If a second rope strand is inserted in the slot and presses on the ratchet wheel, this will in fact result in jamming of the first rope strand. When sliding takes place, the first rope strand will be damaged.

OBJECT OF THE INVENTION

One object of the invention is to remedy these shortcomings by proposing a carabiner which enables securing of the rope inside the carabiner to be improved while at the same time ensuring easy insertion in the carabiner.

For this purpose, the carabiner comprises:
- a body defining an insertion slot of a rope extended by a securing area of the rope,
- a first clamp fitted movable between a standby position of the rope in the insertion slot and an obstruction position when the rope is located in the securing area, the obstruction position being configured to prevent insertion of another rope in the securing area,
- a second clamp configured to allow movement of the rope from the insertion slot to the securing area and to prevent movement of the rope from the securing area to the insertion slot.

In one development, the carabiner comprises a first spring configured to place the first clamp in the standby position when the securing area does not contain a rope.

In a preferential embodiment, the first clamp comprises a first gate separating the insertion slot and the securing area so that the rope moves the first gate from a standby position to a securing position when the rope moves from the insertion slot to the securing area.

Advantageously, the first clamp comprises an obstacle integral to the first gate and fitted in movable manner so that movement of the first gate to the securing area results in the insertion slot being obstructed by the obstacle.

It is advantageous to provide for the first clamp to be fitted movable in rotation.

In preferential manner, the second clamp is a movable clamp configured to move between a standby position closing the securing area and an insertion position of the rope in the securing area.

It is also possible to provide for the carabiner to comprise a second spring configured to place the second clamp in the standby position.

In another embodiment, the second clamp is configured to obstruct the insertion slot when the second clamp is in the insertion position of the rope in the securing area.

In another development, the second clamp comprises a second movable gate separating the insertion slot and the securing area so that the rope moves the second gate from a standby position to the insertion position when the rope moves from the insertion slot to the securing area.

Preferentially, the second clamp comprises an obstacle integral to the second gate and fitted in movable manner so that movement of the second gate to the securing area results in the insertion slot being obstructed by the obstacle.

In a preferential embodiment, the first clamp and second clamp are fitted movable in rotation around the same axis of rotation.

BRIEF DESCRIPTION OF THE DRAWINGS

Other advantages and features will become more clearly apparent from the following description of particular embodiments of the invention given for non-restrictive example purposes only and represented in the appended drawings, in which.

DETAILED DESCRIPTION

Figure 1:
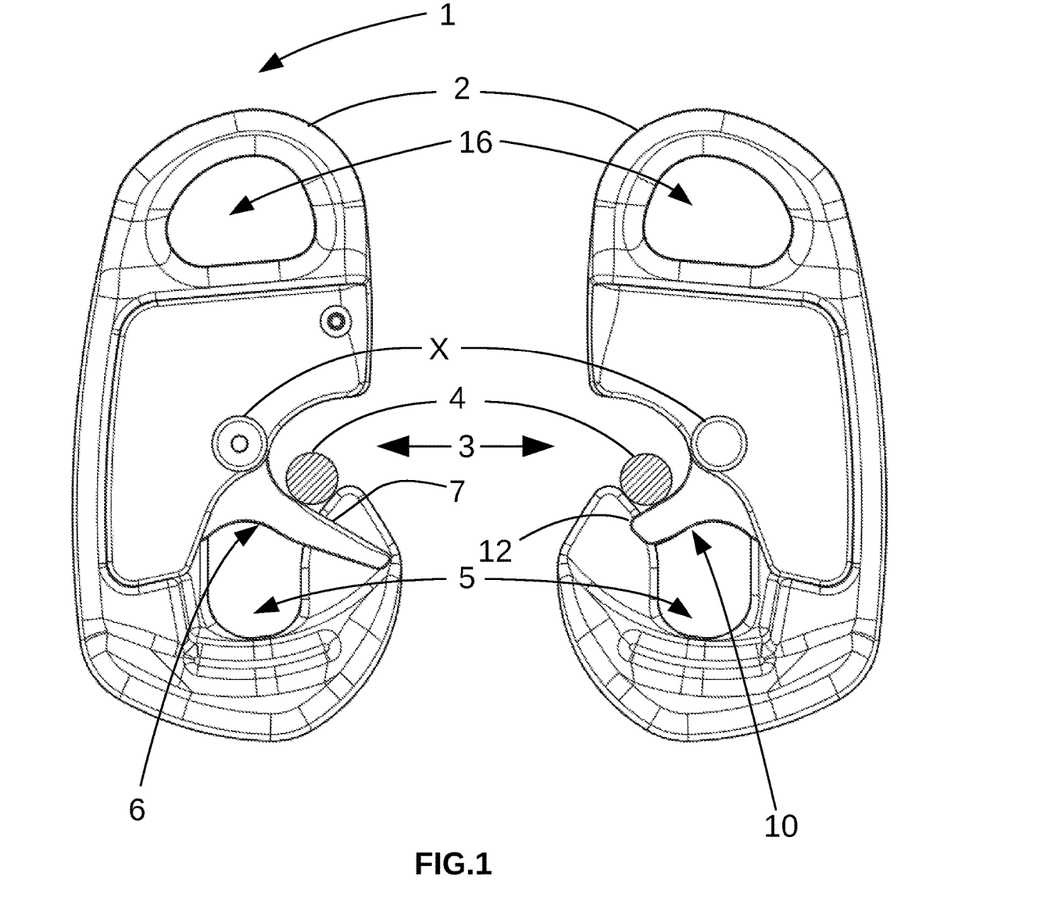
FIG. 1 illustrates, in schematic manner, two opposite side views of the two opposite surfaces of an embodiment of a carabiner when the rope is in the insertion slot.
Figure 2:
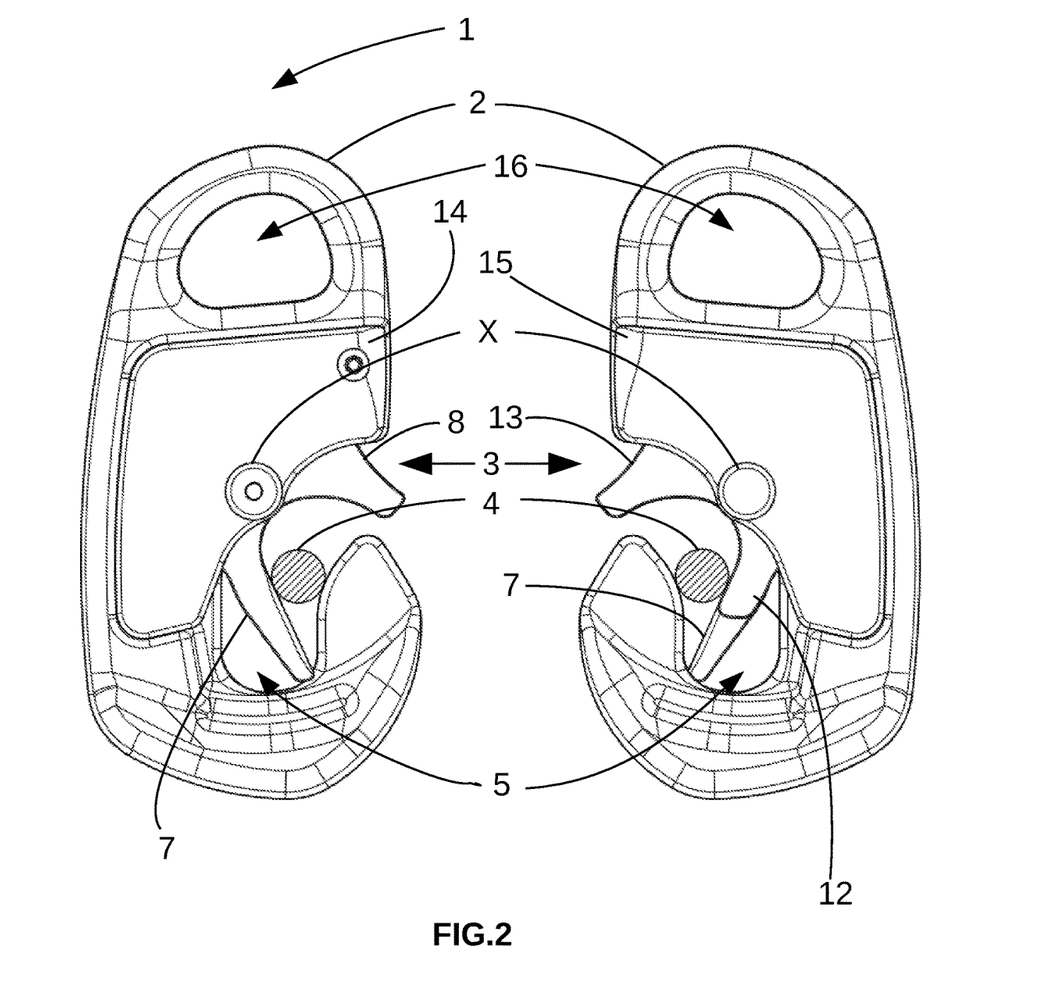
FIG. 2 illustrates, in schematic manner, two opposite side views of the two opposite surfaces of an embodiment of a carabiner when the rope passes through the insertion slot to the securing area.
Figure 3:
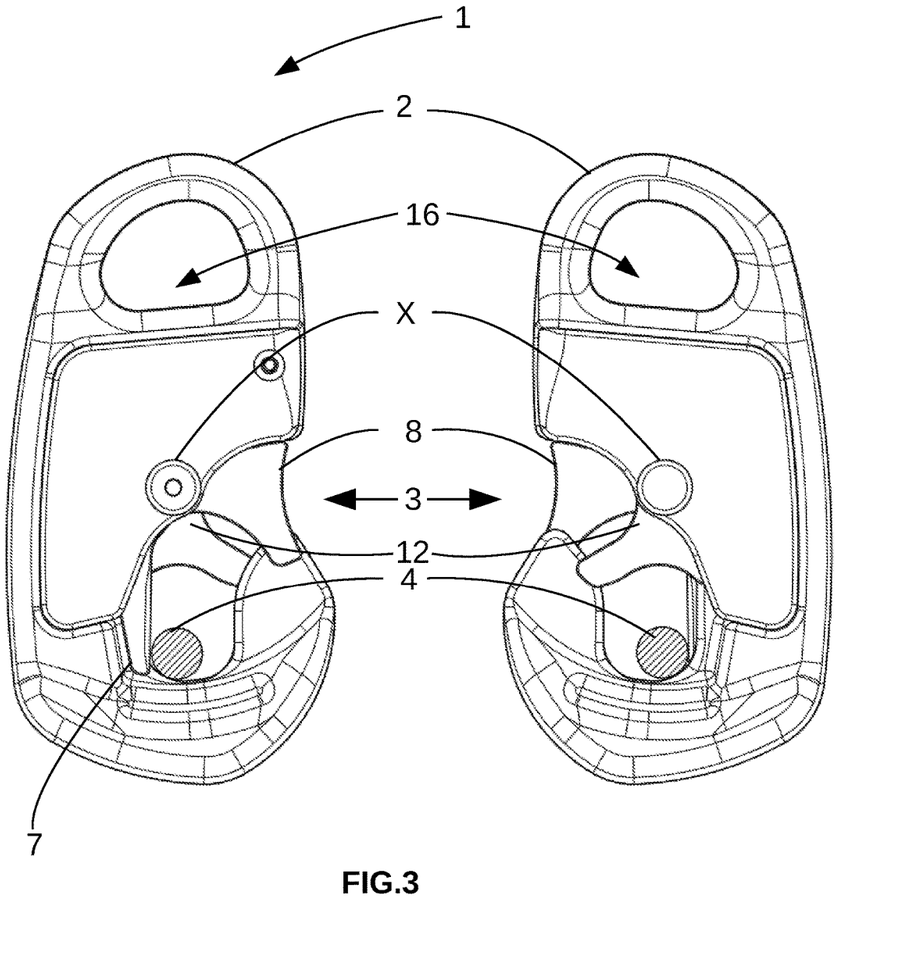
FIG. 3 illustrates, in schematic manner, two opposite side views of the two opposite surfaces of an embodiment of a carabiner when the rope is installed in the securing area.
Figure 4:
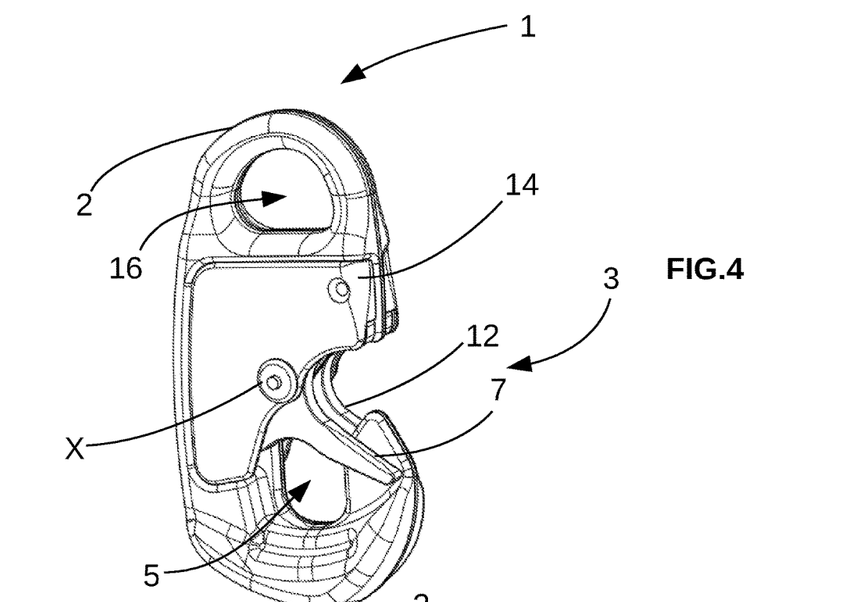
FIG. 4 illustrates, in schematic manner, a perspective view of a carabiner of the invention.

FIGS. 1, 2 and 3 represent opposite side views of a carabiner 1 in different stages of insertion of a rope for the two opposite lateral surfaces of carabiner 1.

Carabiner 1 comprises a body 2 which defines a slot 3 for insertion of a rope 4 and slot 3 is extended by a securing area 5 of rope 4 inside body 2. Body 2 can be of any shape. Body 2 defines a groove so as to form insertion slot 3 and securing area 5. In this way, once rope 4 has been fitted in securing area 5, it remains in the groove while being able to slide in order to enable the climber to perform his descent.

Body 2 can be made from any suitable material. In advantageous manner, body 2 is made from a metallic material. According to the embodiments, body 2 can be formed by a single part or by a set of parts fixed to one another.

As illustrated in FIGS. 1 to 3, rope 4 is inserted in body 2 passing through insertion slot 3 and then moving inside body 2 until it reaches securing area 5.

To prevent a second strand of rope 4 from also being able to enter securing area 5 resulting in rope 4 being released from carabiner 1, it is provided to use a first clamp 6.

First clamp 6 is fitted movable between a standby position of rope 4 and an obstruction position. In the standby position, first clamp 6 is configured to wait for rope 4 in insertion slot 3. In the obstruction position, first clamp 6 is configured to prevent insertion of another rope 4 and in general manner of any other item in securing area 5 via insertion slot 3. In the obstruction position, first clamp 6 is configured to obstruct slot 3.

First clamp 6 is configured to be in the standby position when there is no rope 4 contained in securing area 5. First clamp 6 is configured to be in the obstruction position when securing area 5 contains a rope 4.

As illustrated in FIGS. 1 to 3, first clamp 6 is initially in standby position when rope 4 enters insertion slot 3. Then rope 4 moves until it reaches securing area 5. During this movement, first clamp 6 closes slot 3 for example by means of an obstacle 8 which at least partially closes slot 3.

In the illustrated embodiment, first clamp 6 comprises a first gate 7 which is fitted in movable manner. In advantageous manner, first gate 7 separates insertion slot 3 and securing area 5 so that rope 4 moves first gate 7 from a standby position to a securing position when rope 4 moves from insertion slot 3 to securing area 5. As illustrated in FIGS. 1 and 3, first gate 7 remains in contact with the rope along the whole of its path in the groove until it reaches securing area 5. In advantageous manner, first gate 7 remains in contact with the rope when the rope is in securing area 5.

In particularly advantageous manner, rope 4 moves along first gate 7 when it runs in the groove to prevent the formation of wear points on the first gate.

First clamp 6 advantageously comprises a movable obstacle 8 which moves between a standby position and an obstruction position. In the standby position, insertion slot 3 is free so as to allow insertion of a rope. In the obstruction position, obstacle 8 either partially or totally obstructs slot 3 so as to prevent insertion of a rope or any other item.

In the illustrated embodiment, first clamp 6 comprises a first obstacle 8 integral to first gate 7. First obstacle 8 is fitted movable so that movement from first gate 7 to securing area 5 results in blocking of insertion slot 3 by first obstacle 8.

Preferentially, first obstacle 8 is formed by an additional gate distinct from first gate 7. First clamp 6 defines a groove the side walls of which at least partially form the first gate 7 and additional gate. In this way, rope 4 is inserted in slot 3 and comes up against the bottom of the groove defined by first clamp 6 to press on first gate 7 when descending to securing area 5.

In a particularly advantageous embodiment, first gate 7 is fixed to the additional gate. In this way, the driving movement of first gate 7 by means of rope 4 automatically results in a driving movement of the additional gate which will close insertion slot 3. In the illustrated embodiment, first gate 7 and obstacle 8 are formed by a single part which enables a compact and efficient first clamp 6 to be achieved.

In the illustrated embodiment, first clamp 6 is fitted movable in rotation around an axis X. However, in an alternative embodiment, it is also possible to provide for first clamp 6 to be fitted movable in translation or in any other direction of movement.

It is particularly advantageous to provide for first gate 7 to cause actuation of obstacle 8 as this enables the obstacle to be actuated earlier in the insertion process of rope 4. It is particularly advantageous to provide for first gate 7 to have a standby position in insertion slot 3 and not in securing area 5 as the risks of insertion of two strands of rope 4 in almost simultaneous manner are reduced. In this way, a large degree of freedom can exist in the diameter of rope which can be used or in the width of the groove and the shape of the groove. In the illustrated example, the groove is a single groove, i.e. a groove with side walls which are devoid of a rim and recess to block the rope and prevent the rope from escaping from the groove.

In advantageous manner, first clamp 6 is associated with a first spring 9 which presses on body 2 and which is configured to place first clamp 6 in the standby position. In other words, first spring 9 is configured so that first clamp 6 is in standby position when securing area 5 does not contain a rope 4.

In preferential manner, first gate 7 of first clamp 6 is arranged to remain in contact with rope 4 from the moment the latter is inserted in insertion slot 3 until it is placed in securing area 5. When rope 4 is drawn taut, it opposes the return force applied by first spring 9. First clamp 6 is therefore in the obstruction position whereas rope 4 is located in securing area 5.

In advantageous manner, body 2 defines a first blocking stop in the movement of first clamp 6 when the latter is in the obstruction position. This additional safety feature ensures that the obstacle preventing insertion of a new item in securing area 5 cannot be forced. As an alternative, the blocking stop can be formed by a housing fixed to body 2.

It is also advantageous to provide for body 2 to define a second blocking stop in the movement of first clamp 6 in order to define the standby position. In this configuration, obstacle 8 can come into contact with body 2 or with the housing which opposes the return force applied by first spring 9.

This configuration is particularly advantageous when first clamp 6 is fitted movable in rotation as it is possible to achieve first clamp 6 and the first and second stops which define the amplitude of actuation of first clamp 6 easily and compactly.

In particularly advantageous manner, obstacle 8 used to close insertion slot 3 is arranged so that the surface of carabiner 1 defining insertion slot 3 is devoid of any salient area liable to catch on a rope 4 in the obstruction position. In the illustrated example, obstacle 8 is arranged to form a surface which joins the two opposite ends of slot 3 on the periphery of carabiner 1.

Carabiner 1 also comprises a second clamp 10. Second clamp 10 is configured to enable movement of rope 4 from insertion slot 3 to securing area 5. Second clamp 10 is also configured to prevent movement of rope 4 from securing area 5 to insertion slot 3.

In other words, second clamp 10 is configured to enable movement of rope 4 inside the carabiner in a single direction. In this way, it is impossible for rope 4 to follow the path in the opposite direction to escape from carabiner 1.

In advantageous manner, second clamp 10 is configured to prevent rope 4 from escaping before the rope 4 reaches the securing area 5.

First clamp 6 is distinct from second clamp 10 so as to facilitate performance of the two functions, i.e. dissociating obstruction of the insertion slot 3 and escape of the rope through slot 3 from securing area 5.

There again, it is particularly advantageous to use a second clamp 10 which is a movable clamp. According to the embodiments, second clamp 10 can be fitted in rotation, in translation, or with any other form of movement. The mode of movement of first clamp 6 can be different from the mode of movement of second clamp 10.

In the illustrated embodiment, first clamp 6 and second clamp 10 are both fitted movable in rotation. In particularly advantageous manner, both clamps 6 and 10 are fitted movable in rotation around the same axis of rotation X which makes assembly and maintenance of the device easier to perform. It is however possible to use different axes of rotation between first clamp 6 and second clamp 10.

In an embodiment that is advantageous as it is easy to achieve, second clamp 10 is configured to present a standby position in which second clamp 10 separates securing area 5 and insertion slot 3. Second clamp 10 is also configured to present an insertion position in which second clamp 10 allows a rope to pass between insertion slot 3 and securing area 5.

In a preferential embodiment, second clamp 10 is associated with a second spring 11. Second spring 11 is configured to place second clamp 10 in the standby position when no load is placed on it.

It is advantageous to provide for second clamp 10 to revert to its standby position independently from the presence or not of a rope 4 inside securing area 5.

In a particular embodiment, second clamp 10 presents a second gate 12 which is configured to separate insertion slot 3 and securing area 5. Second gate 12 follows the movement of rope 4 until the insertion position in securing area 5 is reached. At this moment, rope 4 escapes from second gate 12 and second clamp 10 is returned to the standby position by means of second spring 11. Advantageously, second clamp 10 comes up against the stop formed by body 2.

In this way, second gate 12 closes securing area 5, i.e. it defines a closed or almost closed ring so as to prevent rope 4 from escaping from securing area 5. First gate 7 can therefore not return to its standby position and slot 3 is obstructed.

The different illustrated embodiments present a second clamp 10 which is provided with a single gate to close securing area 5. However, in an embodiment that is not illustrated, it is possible to close securing area 5 with at least two parts which are fitted movable and which prevent rope 4 from escaping from securing area 5, for example two opposite gates fitted on the two opposite side walls of the groove.

According to the embodiments, the two parts can be configured to move independently from one another or alternatively movement of one of the parts imposes movement of the other part.

There again, it is advantageous to provide for body 2 to form a blocking stop preventing movement of the gate of second clamp 10 when the latter is subjected to a force which attempts to open the clamp from securing area 5.

Figure 6A:
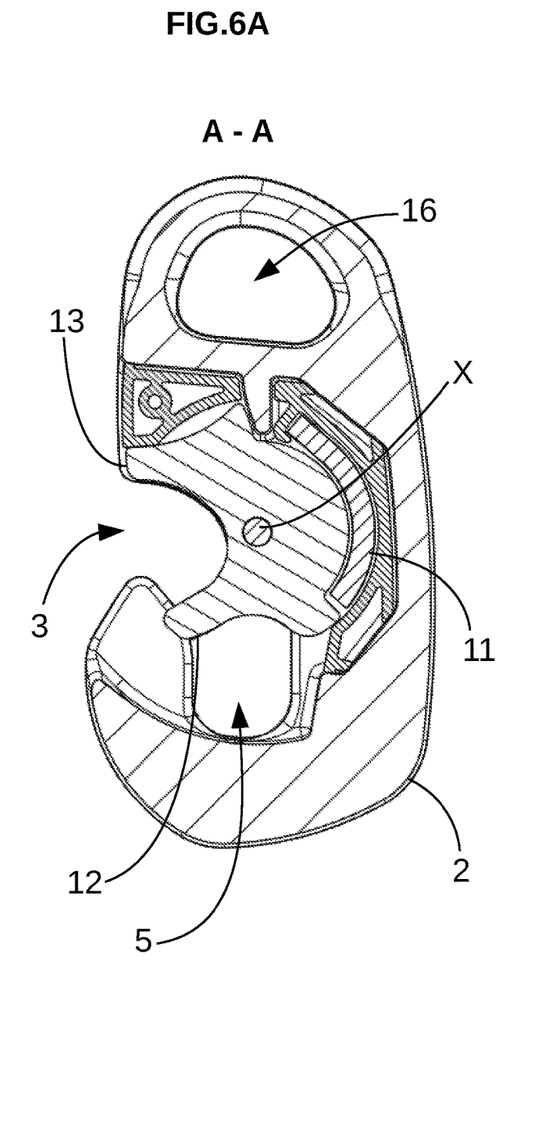
FIGS. 6A and 6B represent, in schematic manner, a cross-section of a carabiner along the line A-A and a front view of a carabiner.

In a particularly advantageous embodiment illustrated in FIG. 6a, second clamp 10 is provided with an obstacle 13 which is configured to prevent insertion of an item in securing area 5 when second clamp 10 is in the open position, i.e. in the position allowing communication between insertion slot 3 and securing area 5.

This obstacle 13 enables the user who reaches the top of a climb to detect malfunctioning of second clamp 10. Second spring 11 is in fact configured to bias second clamp 10 to the standby position. When second spring 11 is defective, for example broken, the latter no longer returns to the standby position and prevents insertion of rope 4. The user knows immediately that the spring will not reset gate 12 to the standby position which closes securing area 5. The user can then place second clamp 10 in the standby position manually, insert rope 4 and place second clamp 10 in the standby position to prevent rope 4 from escaping from the carabiner. The descent of the user will then take place in total safety and a maintenance operation will be performed on the defective carabiner 1.

It is particularly advantageous to provide for second clamp 10 to be configured to at least partially close insertion slot 3. In this way, the risk of rope 4 escaping from securing area 5 is reduced. This configuration enables securing of rope 4 to be ensured regardless of the diameter of rope 4.

In the illustrated embodiment, first clamp 6 is separated from second clamp 10 by body 2 along an axis X which can be the axis of rotation of first clamp 6 and/or of second clamp 10. The axis can also be an axis perpendicular to the sliding plane of first clamp 6 or of second clamp 10.

In the illustrated embodiment, first clamp 6 and second clamp 10 are arranged on the same side of the opening defined inside body 2. In other words, body 2 defines a slot 3 which has a bottom and two opposite side walls and the two clamps 6 and 10 are both fixed to the same side wall.

In an alternative embodiment, first clamp 6 is fixed to a first side wall and second clamp 10 is fixed to the other side wall so that when rope 4 runs through, the two fixing points of clamps 6 and 10 are separated by rope 4.

It is naturally possible to fix either one or both of the clamps on the wall which forms the bottom of slot 3.

If first clamp 6 and/or second clamp 10 are formed by several gates, it is also possible to provide for fixing points of first clamp 6 and/or of second clamp 10 to be located on the two opposite side walls.

Figure 6B:
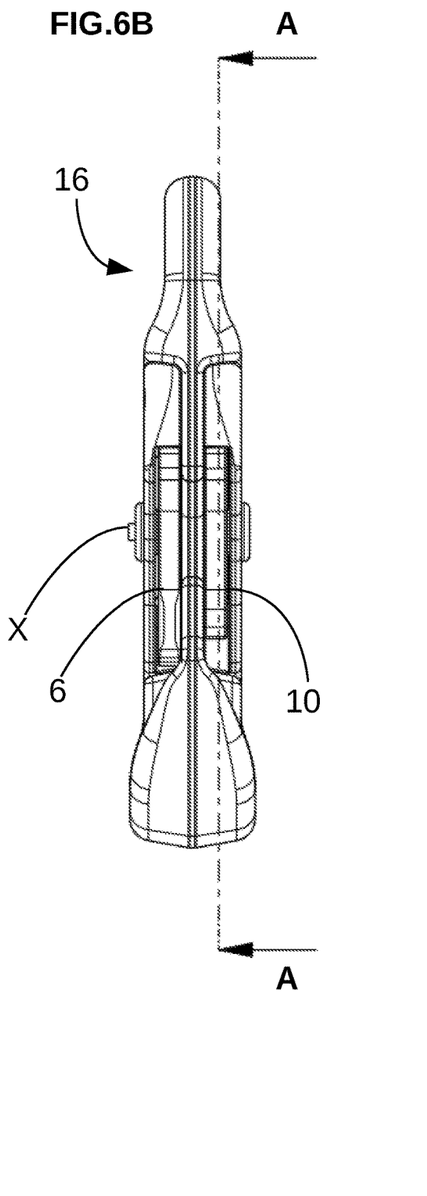

As illustrated in FIG. 6, it is particularly advantageous to use a first spring 9 and second spring 11 which are separated by body 2 along the same axis which separates first clamp 6 and second clamp 10.

It is also advantageous to provide for first clamp 6 to be located in a first housing 14 which is fixed to body 2. First housing 14 defines a stop for one end of first spring 9 to press on. The other end of first spring 9 presses on first clamp 6. As an alternative, the pressing point of the end of first spring 9 can be located on body 2.

It is also advantageous to provide for second clamp 10 to be fitted in a second housing 15 which is fixed to body 2. Second housing 15 defines a stop for one end of second spring 11 to press on. The other end of second spring 11 presses on second clamp 10. As an alternative, the pressing point of the end of second spring 11 can be located on body 2.

The first and/or second housings 14 and 15 can be formed by a metal part, for example a steel plate, an iron plate or an aluminium plate.

First clamp 6 and/or second clamp 10 can be formed by a metal part, for example a steel plate, an iron plate or an aluminium plate. In advantageous manner, body 2 is totally or partially made from steel.

The carabiner comprises fixing means enabling the carabiner to be fixed to another element, for example a fixed point which is located at the top of a climbing route.

In the illustrated example, the fixing means are formed by a hole 16, but it is also possible to use a salient element, for example a screw, a nut or any other part enabling coupling with the fixed point.

In advantageous manner, the body presents a larger thickness close to securing area 5 in the areas designed to come into contact with rope 4 when the user is secured on one end of the rope. In the illustrated embodiment, the carabiner has two areas 17a and 17b of larger thickness located on the two opposite surfaces of body 2.

It is particularly advantageous to provide for first gate 7 to be laterally offset with respect to rope 4 when the rope is in securing area 5. In the illustrated embodiment, first gate 7 is oriented in substantially vertical manner so that the pressing force caused by rope 4 is limited. In this way, sliding of rope 4 when the user descends does not result in deformation of gate 7. It is then possible to use a slimmer gate 7 than that which is used in the prior art and which supports rope 4 when sliding of the latter takes place.

In this configuration, second clamp 10 is dissociated from the rope when sliding of the latter takes place which prevents formation of a detrimental friction area. Obstacle 8 also prevents an additional rope from actuating gate 12 which can prevent a new rope from being inserted in the securing area but which presses on rope 4 which is also detrimental.

Figure 5:
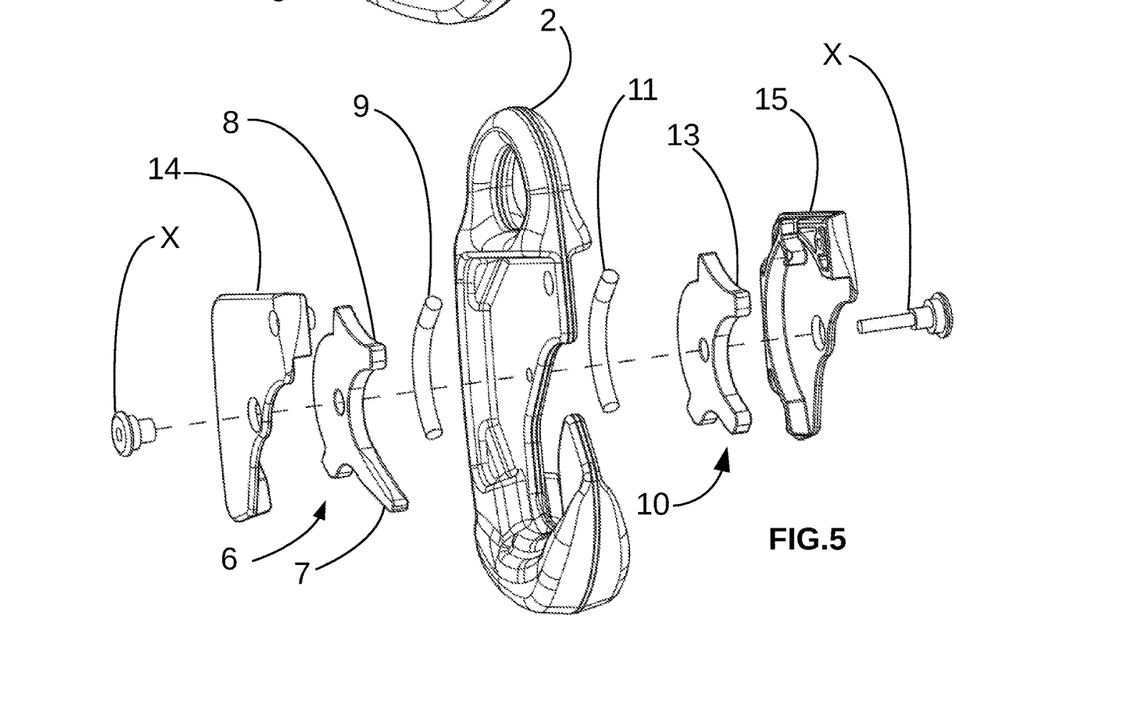
FIG. 5 represents an exploded view of a carabiner according to the invention.

In the illustrated embodiments, the two clamps 6 and 10 are separated by body 2. In an alternative embodiment, the two clamps 6 and 10 can be formed on one side of the body or they can be formed inside body 2, i.e. the two housings 14 and 15 represented in FIG. 5 are formed by body 2 and the central part of the body can be absent.

In preferential manner, the movement of obstacle 8 between the obstruction position and the standby position is different from the insertion movement of the rope so that the insertion force of the rope in the slot does not force the clamp to return to the standby position. This configuration makes it possible to use a first gate 7 and/or second gate 12 which present a flat contact surface with rope 4. It is also possible to use a groove with flat side walls which facilitates manufacturing of the carabiner.

By separating blocking of rope 4 in the securing area and obstruction of slot 3, the carabiner has an enhanced durability. First clamp 6 is not subjected to any force originating from the securing area and does not need to be configured to withstand opposing stresses caused by rope 4 attempting to escape from the securing area or by another strand of rope attempting to enter slot 3.

The invention claimed is:

1. Carabiner comprising:
   a body defining an insertion slot for a rope extended by a securing area for the rope,
   a first clamp fitted movable between a standby position and an obstruction position, wherein in the standby position the first clamp permits introduction of the rope in the securing area via the insertion slot, and in the obstruction position the first clamp prevents insertion of the rope in the securing area via the insertion slot, and the first clamp is in the obstruction position when the first clamp detects a rope in the securing area, and
   a second clamp configured to allow movement of the rope from the insertion slot to the securing area and to prevent movement of the rope from the securing area to the insertion slot independently from the first clamp, the first clamp being distinct from the second clamp, wherein the second clamp is a movable clamp configured to move between a standby position and an insertion position, and wherein in the standby position the second clamp separates the securing area and the insertion slot.

2. Carabiner according to claim 1, comprising a first spring configured to place the first clamp in the standby position.

3. Carabiner according to claim 1, wherein the first clamp comprises a first gate mounted moveable with respect to the body between a standby position and a securing position, the first gate separating the insertion slot and the securing area in the standby position, and wherein the first gate is in the securing area in the securing area in the securing position, the first gate being in the securing position when the first gate detects a rope in the securing area.

4. Carabiner according to claim 3, wherein the first clamp comprises a first obstacle integral to the first gate and fitted in movable manner, when the first clamp is in the standby position the first obstacle does not obstruct the insertion slot and when the first claim is in the obstruction position, the first obstacle obstructs the insertion slot for preventing insertion of the rope.

5. Carabiner according to claim 1, wherein the first clamp is fitted movable in rotation.

6. Carabiner according to claim 1, comprising a second spring configured to place the second clamp in the standby position.

7. Carabiner according to claim 6, wherein the second clamp is configured to obstruct the insertion slot when the second clamp is in the insertion position of the rope in the securing area.

8. Carabiner according to claim 7, wherein the second clamp comprises a second movable gate separating the insertion slot and the securing area so that the rope moves the second gate from a standby position to the insertion position when the rope moves from the insertion slot to the securing area.

9. Carabiner according to claim 8, wherein the second clamp comprises a second obstacle integral to the second gate and fitted in movable manner so that movement of the second gate to the securing area results in the insertion slot being obstructed by the second obstacle.

10. Carabiner according to claim 1, wherein the first clamp and second clamp are fitted movable in rotation around the same axis of rotation.

11. Carabiner according to claim 1, wherein in the obstruction position, the first clamp obstructs the insertion slot.

\* \* \* \* \*